1,780,688

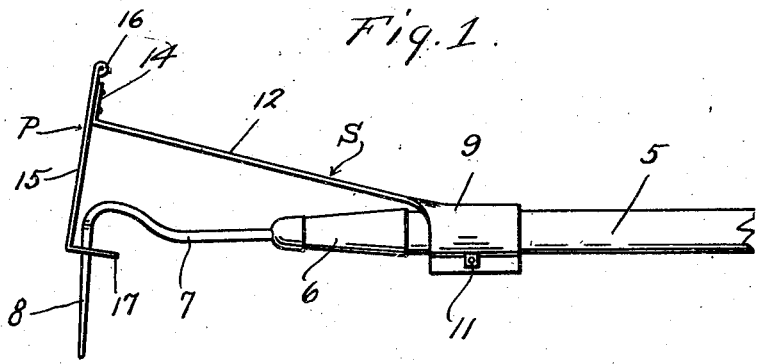
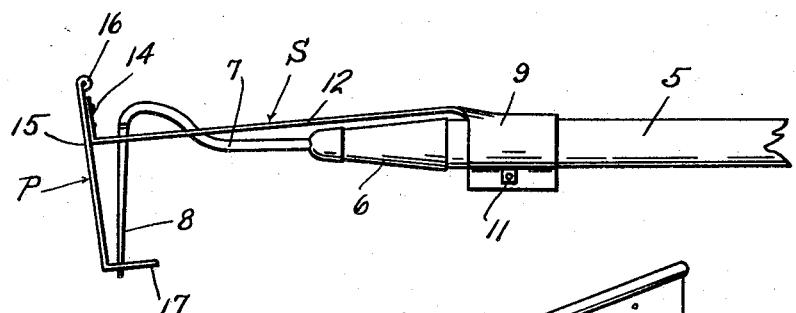
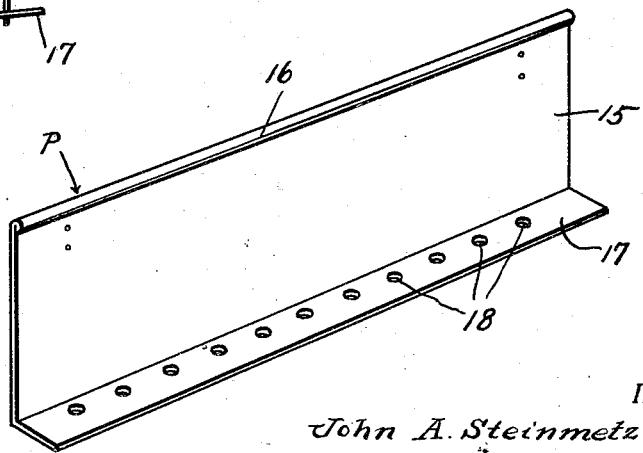
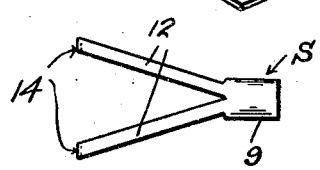
Inventors
John A. Steinmetz
Clyde V. Spaulding
By Clarence A O'Brien
Attorney Patented Nov. 4, 1930

UNITED STATES PATENT OFFICE

JOHN A. STEINMETZ AND CLYDE V. SPAULDING, OF VAN WERT, OHIO

RAKE-CLEANING ATTACHMENT

Application filed January 15, 1930. Serial No. 420,960.

The present invention relates to an attachment for rakes having for its prime object to provide means for cleaning the teeth of the rake in a quick and expeditious manner.

Another very important object of the invention resides in the provision of an attachment of this nature which is exceedingly simple in construction, inexpensive to manufacture, strong and durable, and thoroughly efficient and reliable in use and operation.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of a rake showing the attachment thereon in a raised position, Figure 2 is a similar view showing the attachment in a lowered position, Figure 3 is a perspective view of the cleaning plate, and Figure 4 is a top plan view of the spring support.

Referring to the drawing in detail it will be seen that the numeral 5 denotes a handle with the usual ferrule 6 thereon supporting the shank 7 of the rake proper which includes a plurality of teeth 8.

This rake, of course, does not form part of the invention but is illustrated merely to bring out the utility of the attachment. The attachment comprises a spring fork F and a cleaning plate P. The spring support S comprises a clamp 9 to be disposed about the handle 5 and fixed in place by a bolt 11 and a pair of spring arms 12 diverge from each other from the clamp 9 and terminate in angular extensions 14 riveted or otherwise secured to the plate P.

The plate P includes a body portion 15 having its upper edge rolled as at 16 and at its bottom edge having a right angularly extending integral flange 17 with apertures 18 formed therein to receive the teeth 8.

The spring arms 12 normally hold the flange adjacent the upper ends of the teeth as clearly shown in Figure 1. When it is desired to clean the teeth it is only necessary to move the plate downwardly to the position shown in Figure 2 so that the flange scrapes all the matter which may be clinging to the teeth therefrom.

It is obvious, that by simply inverting the rake so that the rolled edge 16 of the plate P may be moved over the ground, the said plate P may in this manner be used as a leveller for fine dirt or sand.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, combination and arrangement of parts may be resorted to without departing from the spirit or scope of the invention as hereinafter claimed or sacrificing any of its advantages.

Having thus described my invention, what we claim as new is:

A cleaning attachment for a rake, comprising a plate having its body portion provided with a ground levelling bead along one edge and a right angular flange at its opposite edge formed with apertures to receive the teeth of the rake, and a spring support comprising a metal plate having an arcuately bent clamping portion for bracing the handle of the rake and a pair of upwardly inclined relatively diverging flat arms formed integral with a side edge of the said clamp portion and terminating in upwardly disposed angular extensions secured to the cleaning plate below the bead, and fastening means connecting the end of the said clamping portion.

In testimony whereof we affix our signatures.

JOHN A. STEINMETZ.
CLYDE V. SPAULDING.